(12) United States Patent
Datta et al.

(10) Patent No.: US 10,975,234 B2
(45) Date of Patent: Apr. 13, 2021

(54) CROSSLINKED RUBBER DISPERSION IN THERMOPLASTIC VULCANIZATES

(71) Applicant: ExxonMobil Chemical Patents Inc., Baytown, TX (US)

(72) Inventors: Sudhin Datta, Houston, TX (US); Andy H. Tsou, Houston, TX (US); Ron Walker, Pearland, TX (US); Bethany M. Welke, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 25 days.

(21) Appl. No.: 16/375,501

(22) Filed: Apr. 4, 2019

(65) Prior Publication Data

US 2019/0309154 A1 Oct. 10, 2019

Related U.S. Application Data

(60) Provisional application No. 62/653,359, filed on Apr. 5, 2018.

(51) Int. Cl.

| | | |
|---|---|---|
| *C08L 23/16* | (2006.01) | |
| *C08J 3/20* | (2006.01) | |
| *C08J 3/24* | (2006.01) | |
| B29K 23/00 | (2006.01) | |
| B29B 9/06 | (2006.01) | |
| C08K 3/011 | (2018.01) | |
| B29B 9/14 | (2006.01) | |
| B29B 7/90 | (2006.01) | |
| C08L 23/10 | (2006.01) | |
| B29B 7/72 | (2006.01) | |
| C08K 3/04 | (2006.01) | |
| B29B 7/74 | (2006.01) | |
| B29B 7/00 | (2006.01) | |
| C08L 91/00 | (2006.01) | |
| C08K 3/34 | (2006.01) | |
| B29B 7/82 | (2006.01) | |
| B29B 7/46 | (2006.01) | |

(52) U.S. Cl.
CPC ............... *C08L 23/16* (2013.01); *C08J 3/201* (2013.01); *C08J 3/24* (2013.01); *B29B 7/007* (2013.01); *B29B 7/46* (2013.01); *B29B 7/726* (2013.01); *B29B 7/7466* (2013.01); *B29B 7/7495* (2013.01); *B29B 7/826* (2013.01); *B29B 7/90* (2013.01); *B29B 9/06* (2013.01); *B29B 9/14* (2013.01); *B29K 2023/16* (2013.01); *C08J 2323/16* (2013.01); *C08J 2423/10* (2013.01); *C08J 2491/00* (2013.01); *C08K 3/011* (2018.01); *C08K 3/04* (2013.01); *C08K 3/346* (2013.01); *C08L 23/10* (2013.01); *C08L 91/00* (2013.01); *C08L 2205/025* (2013.01); *C08L 2312/02* (2013.01)

(58) Field of Classification Search
CPC ........... B29B 7/7495; B29B 7/90; B29B 9/06; B29B 7/826; B29B 7/46; B29B 9/14; B29B 7/726; B29B 7/7466; B29B 7/007; C08K 3/346; C08K 3/011; C08K 3/04; C08J 3/24; C08J 3/201; C08J 2323/16; C08J 2423/10; C08J 249/00; B29K 2023/16; C08L 91/00; C08L 23/16; C08L 23/10; C08L 2205/025; C08L 2312/02

See application file for complete search history.

(56) References Cited

U.S. PATENT DOCUMENTS

| | | |
|---|---|---|
| 3,037,954 A | 6/1962 | Gessler et al. |
| 4,311,628 A | 1/1982 | Abdou-Sabet et al. |
| 4,594,390 A | 6/1986 | Abdou-Sabet et al. |
| 4,811,628 A | 3/1989 | Winkam et al. |
| 5,177,147 A | 1/1993 | Spenadel et al. |
| 5,656,693 A | 8/1997 | Ellul et al. |
| 6,042,260 A | 3/2000 | Heidemeyer et al. |
| 6,147,160 A | 11/2000 | Wang et al. |
| 7,284,897 B2 | 10/2007 | Blach |
| 9,822,231 B2 | 11/2017 | Yamaguchi et al. |
| 10,294,338 B2 | 5/2019 | Chung et al. ............. 524/447 |
| 2001/0003768 A1 | 6/2001 | Finerman et al. ............ 525/192 |

(Continued)

OTHER PUBLICATIONS

Chapter 18 Internal Mixers: Single- and Twin-Screw Extruders, Process Plant Machinery (Second Edition) 1998, Werner & Pfleiderer Corporation, Ramsey, New Jersey. pp. 651-678. Available at the link: https://www.sciencedirect.com/science/article/pii/B9780750670814500212 (Year: 1998).*

Paul, D. R. et al. (1980) J. Maromol. Sci., Rev. Macromol. Chem., C18, 109.

Boyce et al. (2001) "Micromechanisms of deformation and recovery in thermoplastic vulcanizates," Journal of the Mechanics and Physics of Solids, vol. 49, No. 6, pp. 1323-1342.

Utracki, L. A. (1990) "Polymer Alloys and Blends—Thermodynamics and Rheology", Hanser Publishers, New York, Chapter 3, pp. 131-244.

(Continued)

*Primary Examiner* — Nathan M Nutter (57) ABSTRACT

Use of twin screw extrusion to further enhance the uniformity of crosslinked rubber dispersion in thermoplastic vulcanizates (TPVs) to improve elastic properties of TPVs is disclosed. Most specifically, this invention employs intermeshing twin screw extruders to further homogenize dynamically vulcanized rubber dispersions in TPVs so that their particle size dispersion index (PSDI), or the ratio of weight average equivalent dispersion particle diameter to number average equivalent dispersion particle diameter, can be lowered to less than 1.6 or 1.57 with corresponding elastic property improvements by having lower hysteresis, higher elongation to break, and higher retractive force. TPV products having lower PSDI and improved elastic properties, and apparatus for conducting the disclosed method, are also provided.

9 Claims, 4 Drawing Sheets

(56) References Cited

U.S. PATENT DOCUMENTS

| | | | |
|---|---|---|---|
| 2008/0015313 A1 | 1/2008 | Chung | 525/192 |
| 2008/0132645 A1 | 6/2008 | Muyldermans et al. | |
| 2008/0194734 A1* | 8/2008 | Lehmann | C08L 23/10 |
| | | | 523/351 |
| 2017/0022332 A1 | 1/2017 | Chung et al. | C08J 3/24 |
| 2017/0233513 A1 | 8/2017 | Tsou et al. | |
| 2017/0292016 A1 | 10/2017 | Chung et al. | |
| 2018/0009135 A1 | 1/2018 | Whelan et al. | |
| 2018/0100061 A1 | 4/2018 | Yamaguchi et al. | C08L 23/12 |

OTHER PUBLICATIONS

Boyce et al. (2001) "Micromechanics of cyclic softening in thermoplastic vulcanizates," Journal of the Mechanics and Physics of Solids, vol. 49, No. 6, pp. 1343-1360.

\* cited by examiner

CROSSLINKED RUBBER DISPERSION IN THERMOPLASTIC VULCANIZATES

PRIORITY CLAIM

This application claims priority to and the benefit of U.S. Ser. No. 62/653,359 filed Apr. 5, 2018 and is incorporate herein by reference in its entirety.

FIELD

The present disclosure relates to improved thermoplastic vulcanizate compositions, methods for preparing them, and systems in which the methods can be implemented.

BACKGROUND

The first commercial thermoplastic vulcanizate (TPV) was Santoprene™, and was introduced in the early 1980s. Thermoplastic vulcanizates are thermoplastic elastomers, not thermoset rubbers, and can be processed or re-processed as thermoplastics. Thermoplastic vulcanizates differ from thermoplastics at least by inclusion of dispersed vulcanized rubber particles. Vulcanization, or crosslinking, of rubbers in TPVs is necessary to keep the rubber, which is the majority blend component, as the dispersed phase instead of the continuous phase. Following the Paul-Barrow continuity criterion (D. R. Paul and J. W. Barlow (1980) J. Macromol. Sci., *Rev. Macromol. Chem.*, C18(1), 109-168), where phi 1/phi 2=eta 1/eta 2, the phase with infinite viscosity, such as crosslinked rubbers, would stay dispersed. This allows the packing of a maximum amount of rubber dispersion in a plastic matrix without rubber phase inversion. The maximum packing volume percent is limited by packing physics and is typically less than 70 vol. %. By squeezing in greater than 60 vol. % of crosslinked rubber dispersions inside a plastic matrix, the plastic matrix becomes inter-connecting plastic ligaments sandwiched in between dispersed crosslinked rubber particles.

Without being bound by any theory, the elasticity of a TPV is thought to derive from these thin plastic ligaments sandwiched between dispersed rubber particles. Based on experimental findings and theoretic modeling (e.g. as by M. C. Boyce, S. Socrate, K. Kear, O. Yeh, and K. Shaw, *J. Mech. Phys. Solids*, 49, 1323, (2001), and *J. Mech. Phys. Solids*, 49, 1343, (2001)), these thin plastic ligaments kink or plastic flow during TPV deformation by the incompressible deformation of sandwiching crosslinked rubber dispersions. Subsequently, these plastic ligament kinks act as spatial registrations to allow elastic recovery and to deliver elasticity. Thinner plastic ligaments would be easily deformed and also yield easily, for plastic flow/kink formation, relative to thick plastic ligaments. If the plastic matrix has plastic patches that are relatively large between dispersed rubber particles, these plastic flows and kink developments are not possible and this leads to poorer elastic properties. Rubber dispersion size and uniformity are important to create a uniform plastic ligament network; large particle size and/or a dispersion of particle size that is less uniform degrades the elastic properties of a TPV.

The particle size and uniformity of the rubber dispersion in a TPV can thus constrain the selection of plastic and rubber components for the preparation of a TPV. For a Santoprene™ TPV, which is a TPV based on isotactic polypropylene (iPP) plastic matrix and crosslinked ethylene-propylene-diene terpolymer (EPDM) rubber dispersions, it is important to use fractional melt-flow rate (MFR) iPP to blend with EPDM in a mixer or extruder before the introduction of curatives. Since EPDM typically has much higher molecular weight (MW) than that of an iPP, low MFR and high MW iPP is helpful to provide viscosity matching during initial blending. Viscosity matching allows stress transfer across blend interfaces for finer dispersions (L. A. Utracki, "Polymer Alloys and Blends—Thermodynamics and Rheology", Hanser Publishers, New York, (1990)); in this case, it is to ensure fine iPP dispersions inside the EPDM matrix. Once the curatives are introduced, phase inversion occurs and crosslinked EPDM becomes the dispersed phase. Although decent dispersion of crosslinked rubber can be obtained in a TPV by judicious selections of plastic and rubber components (for viscosity matching) and of twin screw extrusion elements (for phase inversion and rubber dispersion), crosslinked rubber dispersion uniformity in a TPV can be further improved for better elastic properties by certain improvements to the processing of the TPV composition as described herein below.

SUMMARY

Accordingly, disclosed further below is a method for processing a thermoplastic vulcanizate (TPV) composition comprising (consisting of, consisting essentially of):

a) melting at least one selected TPV composition, and if more than one TPV composition is selected then combining the TPV compositions before or after melting, to form a TPV melt; and b) mixing the TPV melt in an intermeshing twin-screw (which can be either of a counter-rotating or co-rotating type) extruder at a temperature sufficient to maintain the TPV composition in the melted state to obtain a TPV re-extrudate; and c) recovering the TPV re-extrudate.

The method can be implemented by preparing the at least one TPV composition by a) combining at least one propylene, ethylene and diene terpolymer ("propylene-ethylene-diene terpolymer", a polyolefin thermoset rubber), a polyolefin plastic, one or more curatives, and optionally one or more diluents, in an intermeshing twin-screw reactive extruder to form a TPV formulation;

b) mixing the TPV formulation for a time sufficient to allow complete phase inversion by dynamic vulcanization to form a crosslinked propylene-ethylene-diene terpolymer phase dispersed in a polyolefin plastic phase, and mixing the resulting TPV composition at a temperature above the melting temperature of the TPV composition to form an extrudate.

Also disclosed herein is a TPV composition obtained by a process comprising (or consisting of, or consisting essentially of):

a) melting at least one selected TPV composition, and if more than one TPV composition is selected then combining the TPV compositions to form a TPV melt; and b) mixing the TPV melt in an intermeshing twin-screw extruder at a temperature sufficient to maintain the TPV composition in the melted state to obtain a TPV re-extrudate; and c) recovering the TPV re-extrudate.

The composition can be one in which the at least one TPV composition is prepared by a) combining at least one propylene-ethylene-diene terpolymer (polyolefin thermoset rubber), a polyolefin plastic, one or more curatives, and optionally one or more diluents, in a twin-screw reactive extruder to form a TPV formulation;

b) mixing the TPV formulation for a time sufficient to allow complete phase inversion by dynamic vulcanization to form a crosslinked propylene-ethylene-diene terpolymer phase dispersed in a polyolefin plastic phase, and mixing the resulting TPV composition at a temperature above the melting temperature of the TPV composition to form an extrudate.

Also disclosed herein is a system for preparing a TPV composition comprising at least two intermeshing twin-screw extruders arranged so that a first intermeshing twin-screw extruder can receive one or more rubber components, polyolefin plastic, any diluent, one or more curative compositions, and any colorant or fillers and can produce an extrudate TPV composition having a melt temperature ranging from T1 (=Tm of the TPV composition) to T2 (up to, but below, the lowest decomposition temperature among the components of the TPV composition), and at least a second intermeshing twin-screw extruder can receive the extrudate TPV composition at temperature from T1 to T2 and can produce a TPV re-extrudate.

DETAILED DESCRIPTION

Figure 1:
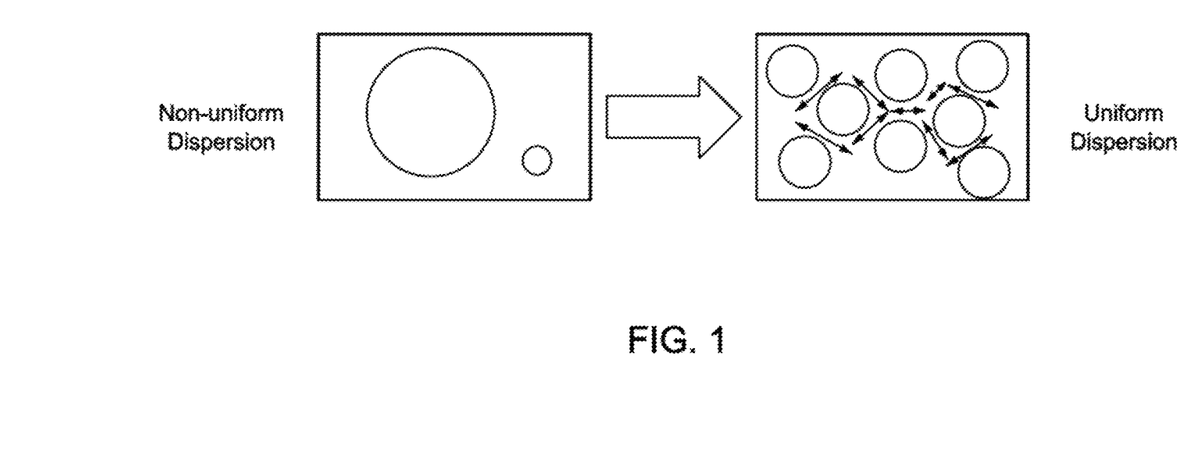
FIG. 1 illustrates rubber dispersion uniformity and plastic ligament formation (left: poor dispersion uniformity, right: good dispersion uniformity; both dispersions have the same rubber volume percent).

As shown in FIG. 1, rubber dispersion uniformity is important to create a uniform plastic ligament network that provides some of the elastic properties of a TPV.

In the methods of the present disclosure, crosslinked rubber dispersions are further homogenized by twin-screw extrusion mixing of a TPV after its preparation. Considering that not all rubber dispersions are fully vulcanized during a TPV manufacture, additional drop break-up to better disperse the crosslinked rubber particles is effected in the present disclosure using a downstream twin screw extruder. Typically, an intermeshing twin screw extruder is necessary to deliver sufficient shear and extensional stresses in the downstream processing to homogenize the crosslinked rubber dispersions, including both drop break-up and coalescence. Crosslinked rubber dispersions in previously prepared TPV composites can be further homogenized by this downstream intermeshing twin-screw extrusion leading to a TPV with improved rubber dispersion uniformity and better elastic properties.

Thermoplastic Vulcanizates (TPVs)

The presently disclosed method can be used to improve the properties of any TPV composite, but is especially useful in improving the properties of TPV composites that exhibit a "Particle Size Dispersity Index" (PSDI), which is defined by the ratio (Dw/Dn) of the weight average (second moment of the particle size distribution) equivalent particle diameter (Dw) to the number average (first moment of the particle size distribution) equivalent particle diameter (Dn), less than 1.6, or 1.57, or other value as described herein.

Thermoplastic vulcanizate (TPV) compositions of various embodiments may comprise, consist essentially of, or consist of: (a) an at least partially vulcanized rubber component dispersed within a continuous thermoplastic matrix; (b) one or more oils; and, optionally, (c) one or more additives (e.g., one or more fillers, foaming agents, or the like). As used in this context, "consist essentially of" means that the TPV formulation or TPV composition is free of other materials except those minor impurities (e.g., 0.1 wt % or less) that one would typically expect in normal commercial operations. For instance, a single process line may be used in a continuous process to create multiple different types of materials in series, and some residuals (e.g., residual polymer, curative, additives, or other material) from previous product campaigns may acceptably be left in such equipment and thus incorporated into a TPV product.

TPVs are formed by dynamically vulcanizing a TPV formulation. The TPV formulation of various embodiments comprises (i) a rubber component (which may or may not be oil-extended), (ii) a thermoplastic resin, (iii) optionally, a polyolefin-based, typically propylene-based, elastomer (PBE) (which may be especially useful in compositions comprising Santoprene™) or a hydrogenated triblock copolymerized thermoplastic elastomer (TPE—for example hydrogenated Kraton™ (Kraton Polymers)), (iv) a vulcanizing agent or curative; (v) processing oil; and (vi) optionally, one or more additives (including, e.g., cure accelerators, metal oxides, acid scavengers, flame retardants, fillers, stabilizers, and the like). A TPV product may therefore alternatively be considered and described as the reaction product of dynamic vulcanization of a TPV formulation or "melt", or as a "dynamically vulcanized alloy" (DVA).

A TPV composition can be prepared in which the rubber component is not vulcanized, but instead comprises polymer chains associated with one another by physical means and thus promoting the inversion of the rubber and plastic phases, such as hydrogen bonds, ionic aggregation, and phase transition (e.g. crystallization or a glass transition); thus, a TPV formulation not yet subjected to a covalent cross-linking chemical reaction can be prepared in which physical cross links can be removed by heating.

Formation of a TPV composition and its resultant properties are first described below, followed by a more detailed description of suitable rubber components, thermoplastic components, vulcanizing agents, processing oil, and additives.

Forming TPVs

As those skilled in the art appreciate, dynamic vulcanization includes a process whereby a rubber that is undergoing mixing with a thermoplastic resin is cured (i.e., crosslinked, or vulcanized) during "dynamic" mixing, not after mixing. The rubber is crosslinked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture (i.e., the TPV formulation) undergoes a phase inversion during dynamic vulcanization, where the blend, which initially includes a major volume fraction of rubber, is converted to a blend where the plastic phase is the continuous phase and the rubber is simultaneously crosslinked and dispersed as fine particles within the thermoplastic matrix.

In general, the dynamic vulcanization of the TPV formulation takes place within a mixer, such as an extruder, melt-mixer, or other internal mixing device in which a chemical reaction can take place (for example, a Banbury mixer or a Brabender mixer). Extrusion mixers operate continuously with low residence time, <3 min, with better operation economics whereas internal mixers operate in a batch mode with long residence time, >5 min. An intermeshing twin-screw extruder is a preferred mixer.

Not all components of the TPV formulation need necessarily be introduced to the reactor at the same time. See, for example, U.S. Patent Publication 2017/0292016, hereby incorporated by reference in its entirety and for all purposes, which discloses addition of colorant and other additives both during and after the dynamic vulcanization process, as well as a "masterbatch" method of adding either or both of a curative formulation and a formulation of additional additives.

For instance, dynamic vulcanization can be performed as follows: the rubber component and thermoplastic component are mixed to form a blend, which may be referred to as a solids blend (although not all components of the blend need necessarily be in the solid state). Optional solid additives, such as cure accelerator, fillers, zinc oxide, and miscellaneous solids such as pigments and antioxidants, may be added to the solids blend. The blend is continually mixed at a temperature above the melt temperature of the thermoplastic resin to form a molten blend. The vulcanizing agent (e.g., curative), which may be in the form of a solid or a liquid, is introduced to the molten blend to form a vulcanizable blend. Heating and mixing continues in order to effect dynamic vulcanization.

Processing oil can be introduced at any stage, or in multiple stages, of the process. For example, oil can be added to the solids blend, to the molten blend, together with the curative (e.g. as a resin-in-oil or "RIO" composition), or after dynamic vulcanization—or at any two or more of the foregoing points in the process.

Methods according to particular embodiments include "preloading" process oil—meaning that a portion of the process oil is introduced to the TPV formulation before the curative is introduced. Surprisingly, it has been found that some degree of oil preloading may result in increased tensile properties of the resulting TPV, without increasing hardness, which may be desired in some foaming applications.

According to such embodiments, the preloaded oil (e.g., a first portion of process oil) is introduced into the molten blend of TPV formulation components before introducing the curative. Preferably, at least 15 wt %, more preferably at least 30 wt %, such as at least 40 wt %, or at least 50 wt %, of the total process oil used in forming the TPV is preloaded (i.e., introduced before the curative). In some embodiments, the amount of preloaded process oil is within the range from 15 to 60 wt %, such as 20 to 60 wt %, preferably 25 to 60 wt %, such as 25 to 55 wt %, 30 to 50 wt %, or 35 to 45 wt %, with ranges from any of the foregoing low ends to any of the foregoing high ends also contemplated in various embodiments. These weight percentages are based on total weight of process oil added to the TPV formulation (which is exclusive of any extender oil that may be present in the rubber component, but which includes process oil that might be added to the process with the curative, as is the case with phenolic resin-in-oil curatives).

Following dynamic vulcanization, mixing may continue and additional additives or ingredients can be incorporated into the molten product, which may be referred to as a molten thermoplastic vulcanizate. For example, post-vulcanization additives, such as acid scavengers (and additional process oil, as noted), can be added to the molten mass following dynamic vulcanization. The product can then be extruded through an extruder die, or otherwise fabricated, and ultimately cooled for handling and/or further processing. For example, the molten thermoplastic vulcanizate composition may be cooled and/or solidified and subsequently pelletized for future storage and/or shipment. Unless so specified, practice of embodiments of the present invention is not limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruders). Methods and equipment for continuously preparing thermoplastic vulcanizates are described in U.S. Pat. Nos. 4,311,628; 4,594,390; 5,656,693; 6,147,160; and 6,042,260, as well as WO 2004/009327, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

Rubber Component

The rubber component of TPV formulations of various embodiments is preferably a crosslinkable (vulcanizable) rubber component, such that upon dynamic vulcanization, the rubber component in the resulting TPV composition (i.e., resulting from processing, including by dynamic vulcanization, of the TPV formulation) of such embodiments is at least partially crosslinked, preferably fully crosslinked.

Any rubber suitable for use in the manufacture of TPVs can be used to manufacture (and be present in) the TPV compositions of some embodiments of the present invention. The term "rubber" refers to any natural or synthetic polymer exhibiting elastomeric properties, and may be used herein synonymously with "elastomer". The rubber component may comprise one rubber, or a mix of two or more rubbers.

For example, the rubber component can be any olefin-containing rubber such as ethylene-propylene copolymers (EPM), including in particular saturated compounds that can be vulcanized using free radical generators such as organic peroxides, as described in U.S. Pat. No. 5,177,147. Other rubber components can include ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms. U.S. Pat. Nos. 3,037,954 and 4,811,628, hereby incorporated by reference in their entirety and for all purposes, describe TPVs having a polypropylene matrix and EPDM rubber component.

The rubber component can also be a propylene-ethylene-diene terpolymer (PEDM)-type rubber. PEDM-type rubbers are described in, e.g. US Patent Publication 2017/0233513, hereby incorporated by reference in its entirety and for all purposes. US Patent Publication 2017/0292016 and WO 2016/137556, hereby incorporated by reference in their entirety and for all purposes, disclose TPV compositions comprising one or the other of EPDM- and PEDM-type rubbers.

The rubber component can also be a butyl rubber. The term "butyl rubber" includes a polymer that predominantly includes repeat units from isobutylene, but also includes a few repeat units of a monomer that provides a site for crosslinking. Monomers providing sites for crosslinking include a polyunsaturated monomer such as a conjugated diene or divinyl benzene. In one or more embodiments of the invention, the butyl rubber polymer can be halogenated to further enhance reactivity in crosslinking. Those polymers are referred to as "halobutyl rubbers".

Further, the rubber component can be homopolymers of conjugated dienes having from 4 to 8 carbon atoms and rubber copolymers having at least 50 wt % repeat units from at least one conjugated diene having from 4 to 8 carbon atoms. The rubber component can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers can also be used. Examples of those include maleated EPDM, and epoxy-functionalized natural rubbers.

Preferred rubber component include, but are not limited to, ethylene-propylene rubber, ethylene-propylene-diene rubber, natural rubber, butyl rubber including halobutyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 wt % repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereon.

The rubber component is preferably present in the TPV formulation in an amount within the range from 40 to 80 wt %, preferably 50 to 70 wt %, such as 55 to 65 wt %, based on total weight of the TPV, excluding both of processing and extender oils, with ranges from any of the foregoing low ends to any of the foregoing high ends also contemplated in various embodiments. Note that these wt % values for rubber component are exclusive of any extender oil that may be formulated with the rubber component (e.g., for ease of processing). The TPV formulation of some embodiments may optionally comprise 5 to 30 wt %, such as 10 to 25 wt % or 12 to 24 wt % (with ranges from any of the foregoing lows to any of the foregoing highs also contemplated) of extender oil, where the rubber component includes extender oil.

Alternatively, the rubber component amount in the TPV composition may be expressed in terms of wt % inclusive of any extender oil that may be present in the rubber component, but not including any oil added during processing ("processing oil"). In such cases, the rubber component (inclusive of extender oil) may be present in the TPV composition within the range from 35 to 80 wt %, preferably 45 to 70 wt %, such as 50 to 65 wt % (again, with ranges from any of the foregoing lows to any of the foregoing highs also contemplated in various embodiments).

Thermoplastic Component

The TPV formulations and TPV compositions of various embodiments include a thermoplastic component comprising at least one olefinic thermoplastic resin. The thermoplastic resin may be a polymer or polymer blend considered by persons skilled in the art as being thermoplastic in nature, e.g., a solid polymer that softens and becomes molten when exposed to heat and returns to solid when cooled to room temperature. The olefinic thermoplastic component may contain one or more polyolefins, including polyolefin homopolymers and polyolefin copolymers.

In certain embodiments, the thermoplastic component may additionally include a propylene-based elastomer such as Vistamaxx™ propylene-based elastomer available from ExxonMobil Chemical Company. In yet further embodiments, the thermoplastic component may also or instead include a high-melt-strength thermoplastic resin (described in more detail below).

Thermoplastic Resins: Illustrative thermoplastic resins suitable for inclusion in the thermoplastic component according to various embodiments may be prepared from monoolefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non-crosslinked in the resulting TPV (i.e., it is non-vulcanizable or non-crosslinkable as present in the TPV formulation, prior to dynamic vulcanization).

In preferred embodiments, the thermoplastic resin is an olefinic thermoplastic resin that comprises, or consists of, polypropylene. The term "polypropylene" as used herein broadly means any polymer that is considered a "polypropylene" by persons skilled in the art and includes homopolymers as well as impact, random, and other copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from one or more olefins selected from the group consisting of ethylene and $C_4$-$C_{10}$ α-olefins.

The thermoplastic resin may have a melting temperature of at least 110° C. (230° F.), or at least 120° C. (248° F.), or at least 130° C. (266° F.), and may range from 110° C. (230° F.) to 170° C. (338° F.) or higher as measured by Differential Scanning Calorimetry (DSC). The procedure for DSC is described as follows: 6 to 10 mg of a sheet of the resin pressed at approximated 200° C. (392° F.) to 230° C. (446° F.) is removed with a punch die and then annealed at room temperature (about 23° C. (74° F.)) for 240 hours. At the end of this period, the sample is placed in a Differential Scanning Calorimeter (Perkin Elmer 7 Series Thermal Analysis System) and cooled at a rate of 10° C. (50° F.)/min to −50° C. (−58° F.) to −70° C. (−274° F.). The sample is then heated at a rate of 20° C. (68° F.)/min to attain a final temperature of 200° C. (392° F.) to 220° C. (428° F.). The thermal output during this heating cycle is recorded as the area under the melting peak of the sample and is measured in Joules as a measure of the heat of fusion. The melting temperature is recorded as the temperature of the greatest heat absorption within the range of melting of the sample.

In some embodiments, the thermoplastic resin has MFR of 15 g/10 min or less, more preferably 10 or less, 5 or less, 3 or less, or even 1 or less, in some embodiments (measured per ASTM D-1238, at 230° C. (446° F.) and 2.16 kg mass). For instance, MFR of the thermoplastic resin may be within the range from a low of any one of 0.01, 0.1, and 0.5 g/10 min to a high of any one of 1, 3, 5, 10, and 15 g/10 min (ASTM D-1238, 230° C. (446° F.) and 2.16 kg). In certain of these embodiments, the thermoplastic component comprises only thermoplastic resin with MFR according to the foregoing description.

In yet other embodiments, however, a TPV composition (or a TPV formulation) may comprise two or more thermoplastic resins. In particular, the TPV formulation or composition may comprise (i) a thermoplastic resin having MFR of 15 g/10 min or less (or other MFR per the above description); and (ii) a high-MFR thermoplastic resin having MFR of greater than 15 g/10 min, for instance, within the range from greater than 15 to 50 g/10 min, preferably within the range from greater than 15 to 25 g/10 min, such as 16 to 24 g/10 min. The high-MFR thermoplastic resin may otherwise be in accordance with the above-given descriptions of suitable thermoplastic resins (e.g., with respect to monomeric constituents, melting temperature, and the like). In certain of these embodiments employing multiple thermoplastic resins, the TPV composition and/or formulation preferably includes more low-MFR thermoplastic resin than high-MFR thermoplastic resin. The low-MFR thermoplastic resin is used to provide viscosity matching during TPV manufacturing for finer vulcanized rubber dispersions whereas the high-MFR thermoplastic resin is employed to provide TPV processability for injection molding and other fabrication techniques that require lower TPV viscosity. For instance, of the combined weight of the low-MFR and high-MFR thermoplastic resin, 51 to 99 wt % is low-MFR, such as 55 to 95 wt %, or 55 wt % to 75 wt %, with the balance being the high-MFR thermoplastic resin.

In summary, then, TPV compositions and/or formulations according to some embodiments include a first (low-MFR) thermoplastic resin and optionally a second (high-MFR) thermoplastic resin, such that the second thermoplastic resin is present at 0 wt % to 49 wt % of the combined amount of first and second thermoplastic resin. Where the second thermoplastic resin is present, it is preferably present within the range of 1 wt % to 49 wt %, such as 5 to 49 wt %, or 10 to 35 wt %, such as 12 to 33 wt %, of the combined amount of first and second thermoplastic resin (with ranges from any of the foregoing lows to any of the foregoing highs, e.g., 1 to 33 wt %, also contemplated in various embodiments).

Propylene-Based Elastomer: In yet other embodiments, the thermoplastic component may comprise a propylene-based elastomer (PBE). A PBE may be present in the TPV formulation of some embodiments within the range from 3 to 20 wt %, preferably from 4 to 15 wt %, such as 4 to 12 wt % or 5 to 10 wt %, with ranges from any of the foregoing lows to any of the foregoing highs also contemplated in various embodiments. Although it is possible to blend (e.g., coextrude, melt-mix or the like) PBE with a vulcanized TPV material, in this case as an "additive", to form the resulting TPV, it is preferred that the PBE be present in the TPV formulation prior to dynamic vulcanization (that is, preferred TPVs are formed such that the PBE is present in the TPV formulation at the time of dynamic vulcanization, and preferred methods include dynamic vulcanization in the presence of the PBE).

Preferred PBEs are those in accordance with the propylene-based elastomer described in Paragraphs [0055]-[0075] of WIPO Patent Publication No. WO 2015/095987, which description is incorporated by reference herein. As set forth therein, the PBE preferably has reduced crystallinity and/or melting point as compared to highly isotactic polypropylene due to introduction of errors in the insertion of propylene. The PBE is generally devoid of any substantial intermolecular heterogeneity in tacticity and comonomer composition, and also generally devoid of any substantial heterogeneity in intramolecular composition distribution.

Particularly preferred PBEs in accordance with that description for use in embodiments of the present invention include copolymers of propylene and one or more comonomers selected from the group consisting of ethylene and $C_4$-$C_{10}$ α-olefins; most preferred are propylene-ethylene copolymers. The PBE has at least 60 wt % units derived from propylene (based on total mass of the PBE), such as within the range from a low of any one of 60, 65, 70, 75, 80, 84, and 85 wt % to a high of any one of 85, 90, 92, 94, and 95 wt %, provided the high end of the range is greater than the low end. The balance of the PBE is preferably derived from ethylene, although in some embodiments the PBE may include one or $C_4$-$C_{10}$ comonomers instead of or in addition to ethylene.

Preferred PBEs have one or more, preferably two or more or three or more, most preferably four or more, or all, of the following properties:

MFR of 1 to 20 g/10 min (ASTM D-1238, 230° C. and 2.16 kg). Most preferably, however, MFR of the PBE is within the range from 1 to 10, more preferably within the range from a low of 1 or 2 g/10 min to a high of 4 or 5 g/10 min;

Melting point $T_m$ of 105° C. or less, such as within the range from 25° C., 60° C., 70° C., or 90° C. to 105° C. (determined as by the DSC procedure described in the section above);

Heat of fusion ($H_f$) as determined by DSC (by the procedure described in the section above) of 80 J/g or less, such as within the range from a low of any one of 1, 3, 5, 6, and 7 J/g to a high of any one of 30, 35, 40, 45, 50, 60, 70, 75, and 80 J/g;

Triad tacticity of three propylene units, as measured by $^{13}$C NMR, of at least 75%, such as within the range from 75, 80, 82, or 85% to 97% or 99%; and Density of 0.850 g/cc to 0.900 g/cc (measured at room temperature per ASTM D1505).

Some embodiments may include one or more different PBEs, i.e., propylene-based elastomers each having one or more different properties such as, for example, different comonomer or comonomer content. Such combinations of various propylene-based elastomers are all within the scope of the invention.

Examples of the propylene-based elastomers may be those available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

Optional High Melt-Strength Thermoplastic Resin: High melt-strength thermoplastic resins, such as disclosed in U.S. Patent Publication 2008/0132645, hereby incorporated by reference in its entirety, can be used as a thermoplastic component of a TPV. In some embodiments, a dynamically vulcanized TPV composition is blended with a high-melt-strength thermoplastic resin. According to some embodiments, a high melt-strength thermoplastic resin is instead incorporated into the TPV formulation (e.g., as part of the thermoplastic component of the TPV formulation) so that dynamic vulcanization occurs in the presence of the high-melt-strength thermoplastic resin. That is, it is specifically contemplated that some embodiments may include blending the high-melt-strength thermoplastic resin into a TPV formulation prior to or during dynamic vulcanization of the TPV formulation to form a foamable TPV composition according to various embodiments. In such embodiments, the high melt-strength thermoplastic resin may be added at an amount within the range from a low of 15, 20, or 25 wt % to a high of 30, 35, 40, 50, 60, 65, or 70 wt % of the high melt-strength thermoplastic resin, such wt % based on the total weight of the components of the TPV formulation, including both of extender and processing oils.

Amount of Thermoplastic Component: In many embodiments, the thermoplastic component of a TPV composition and/or TPV formulation (comprising thermoplastic resin(s) and, together with optionally (though infrequently used) PBE(s) and/or high-melt-strength thermoplastic resin(s)), makes up from 10 to 40 wt % of the TPV composition and/or TPV formulation, based on the total weight of the TPV formulation, including both of extender and processing oils. Other contemplated ranges include 15 to 30 wt % and 17 to 25 wt %, with ranges from any of the foregoing low ends to any of the foregoing highs ends also contemplated in various embodiments.

Oil

TPVs (and TPV formulations used in making the TPVs) may further comprise oil, including process oil (added to the TPV formulation, as described previously) and/or extender oil (which may be present in the rubber component included in the TPV formulation, also as described previously). The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha-olefinic synthetic oils, such as liquid polybutylene. Additive oils other than petroleum-based oils can also be used, such as oils derived from coal tar and pine tar, as well as synthetic oils, e.g., polyolefin materials. In particular embodiments, oil included in the TPV is selected based on API groupings (e.g., an API Group I, Group II, Group III, Group IV, or Group V base stock oil may be used as the oil in the TPV). In particular embodiments, oil included in the TPV comprises Group II or higher oil, such as Group II oil (e.g., ParaLux™ 6001R process oil, available from Chevron-Texaco Corp.). Also or instead, the oil could include white oil (e.g., pharmaceutical grade oil, such as Primol™ 542 medicinal grade white oil, available from ExxonMobil Chemical Company, Baytown, Tex.).

Process oil may be added to a TPV formulation (and/or may be present in a resulting TPV composition) in total amounts ranging from 5 to 200 phr (parts by weight per 100 parts by weight rubber component), preferably 50 to 150 phr, such as 75 to 125 phr, with ranges from any of the foregoing lows to any of the foregoing highs also contemplated in various embodiments. Put in terms of wt %, process oil may be added to the TPV formulation in amounts within the range from 10 to 70 wt %, preferably 20 to 60 wt %, such as 40 to 60 wt %, such weight percentages based on total weight of the TPV formulation, and with ranges from any of the foregoing lows to any of the foregoing highs also contemplated in various embodiments.

Extender oil may be present in the rubber component in amounts within the range from 0 phr to 150 phr, such as 25 to 125 phr, or 50 to 100 phr (0 to 30 wt %, preferably 10 to 25 or 12 to 20 wt %, based on total weight of the TPV formulation), with ranges from any of the foregoing lows to any of the foregoing highs also contemplated.

Total additive oil (extender oil+process oil) may therefore be within the range from 5 to 350 phr (or 5 to 70 wt %) based on total weight of TPV formulation.

Cure Agents

The TPV formulation also includes a vulcanizing agent, which may be at least in part consumed during dynamic vulcanization of the TPV formulation. Any vulcanizing agent that is capable of curing or crosslinking the rubber employed in preparing the TPV may be used. For example, where the rubber includes an olefinic elastomeric copolymer, the cure agent may include peroxides, phenolic resins, free radical curatives, and/or other curatives conventionally employed. In some embodiments, the vulcanizing agent comprises a phenolic resin, and may be, for instance, a phenolic resin-in-oil cure agent (where the oil added with the resin forms part of the process oil added to the TPV formulation during processing). Cure accelerators (e.g., metal halides such as stannous chloride, zinc oxide, and the like) may be used in the TPV formulation in conjunction with the vulcanizing agent. Particularly useful vulcanizing agents, including phenolic resins, and cure accelerators, including stannous chloride, are described in Paragraphs [0046]-[0054] of PCT Publication No. WO 2016/137556, filed Dec. 10, 2015, which description is hereby incorporated by reference.

Other Additives

The TPV formulations and/or TPV compositions of various embodiments may also include one or more additives, including metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art. In some embodiments, the composition further comprises at least one additive selected from fillers, processing aids, curing accelerators, or combinations thereof.

For example, a TPV formulation or composition may include reinforcing and non-reinforcing fillers, antioxidants, stabilizers, antiblocking agents, anti-static agents, waxes, foaming agents, pigments, flame retardants and other processing aids (other than the process oils described above) known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, a TPV formulation includes at least 5, 6, 7, 8, 9, or 10 wt % of one or more fillers, such as calcium carbonate, clays, silica, talc, titanium dioxide, carbon black, and blends thereof, based on the weight of the TPV formulation. In preferred embodiments, the TPV formulation includes clay and/or carbon black in an amount ranging from a low of any one of 5, 6, 7, 8, 9, or 10 to a high of any one of 15, 16, 17, 18, 19, or 20 wt % based on the total weight of the TPV formulation. In one or more embodiments, the TPV formulation comprises antioxidants in an amount less than or equal to 5 wt %, or 4 wt %, or 3 wt %, or 2 wt %, or 1 wt %, or 0.5 wt %, based on the total weight of the TPV formulation.

Extrusion Homogenization

A TPV composition as described above is homogenized by melting at least one TPV composition as described above and then mixing the melted TPV, optionally with inclusion of further additives as they are described above. The TPV melt can include two or more TPV compositions from among those described in detail above.

The TPV melt can include a TPV prepared by:

a) combining at least one propylene-ethylene-diene terpolymer (polyolefin thermoset rubber), a polyolefin plastic, one or more curatives, and optionally one or more diluents, in a twin-screw reactive extruder to form a TPV formulation;

b) mixing the TPV composition for a time sufficient to allow complete phase inversion by dynamic vulcanization to form a crosslinked propylene-ethylene-diene terpolymer rubber phase dispersed in a polyolefin plastic phase, and mixing the resulting TPV composition at a temperature above the melting temperature of the TPV composition to form an extrudate.

The TPV composition is melted by heating it at least to the Tm of the plastic matrix, typically to a temperature 30 to 50° C. (86 to 122° F.) above Tm of the plastic matrix, but below the lowest degradation temperature among the components of the TPV.

In the instance of a TPV having isotactic polypropylene (iPP) with a Tm of 150-160° C. (302-320° F.) as a plastic matrix, a melt temperature of from 180-250° C. (356-482° F.) is typical. For PP matrices generally, the melt temperature should be kept below 300° C. (572° F.) to prevent PP degradation.

The melted TPV composition is then further mixed and extruded in an intermeshing twin-screw extruder at a temperature sufficient to maintain the TPV composition in a molten state. Thus, the further mixing and extrusion temperature can be the same as the melting temperature and this is typically so.

There are many commercially available twin-screw extruders, including counter-rotating and co-rotating intermeshing twin-screw extruders, for example, those produced by Leistritz, Werner Pfleiderer, Thermo Scientific and Haake. Tangential twin-screw extruders, which are not intermeshing, do not provide sufficient mixing power.

A screw speed of from 50 to 500 rpm is typically used for the homogenizing and extrusion, for example from 50-300 rpm, or 50-250 rpm, or from 100-250 rpm, or from 150-500 rpm or from 250-500 rpm, with ranges from any of the foregoing lows to any of the foregoing highs also contemplated.

The homogenizing and extruding are conducted at a pressure of from 1-20 bar. The pressure can be from 1-15 bar, from 1-10 bar, from 1-5 bar. The pressure can be from 2-20 bar, from 2-15 bar, from 2-10 bar. The pressure can be from 4-15 bar, from 4-10 bar or from 4-6 bar. The pressure can be from 5-15 bar or from 5-10 bar. Ranges from any of the foregoing lows to any of the foregoing highs are also contemplated.

Homogenized TPV Products

Another aspect of the present disclosure is a product that is a TPV composition obtained by a process comprising a) melting at least one selected TPV composition, and if more than one TPV composition is selected then combining the TPV compositions, before or after melting them, to form a TPV melt; and b) mixing the TPV melt in an intermeshing twin-screw extruder at a temperature sufficient to maintain the TPV composition in the melted state to obtain a TPV re-extrudate; and c) recovering the TPV re-extrudate.

The TPV composition selected in a) can be one obtained by:

a) combining at least one propylene-ethylene-diene terpolymer (polyolefin thermoset rubber), a polyolefin plastic, one or more curatives, and optionally one or more diluents, in an intermeshing twin-screw reactive extruder to form a TPV formulation; and b) mixing the TPV formulation for a time sufficient to allow complete phase inversion by dynamic vulcanization to form a crosslinked propylene-ethylene-diene terpolymer rubber phase dispersed in a polyolefin plastic phase, and mixing the resulting TPV composition at a temperature above the melting temperature of the TPV composition.

A TPV product as disclosed herein can be one comprising the components as described above and having a particle size dispersion index ("PSDI"), herein defined as the ratio Dw/Dn, wherein Dn and Dw are number average (first moment) and weight average (second moment) dispersion equivalent diameters, respectively, of the particle size distribution. (See, e.g. Table 2 below).

In any embodiment the inventive TPV product has a PSDI of less than 1.6, or 1.57, or 1.56, or 1.55, or 1.54, or 1.52, or 1.50, or 1.45, or 1.40; or be within a range from 1.0, or 1.2, or 1.3 to 1.40, or 1.45, or 1.50, or 1.52, or 1.54, or 1.55, or 1.56, or 1.57, or 1.6. Ranges from any of the low endpoints to any of the high endpoints of the ranges above are contemplated.

Apparatus for Extrusion Homogenization

Another aspect of the present disclosure is an apparatus for performing a method as disclosed above.

Accordingly, a system for preparing a TPV composition can be one comprising at least two intermeshing twin-screw extruders arranged so that a first intermeshing twin-screw extruder, configured to receive polyolefin rubber, polyolefin plastic, any diluent, one or more curative compositions, and any colorant or fillers and configured to produce an extrudate TPV composition having a melt temperature ranging from T1 to T2 (where T1 is the melting temperature determined by DSC as described above, and T2 is higher than T1 and up to, but below, the lowest decomposition temperature among the TPV components); in some embodiments, among the elements of such a configuration, a first intermeshing twin-screw extruder can have a length/diameter ratio >30, and preferably >40. The first intermeshing twin-screw extruder is configured to feed the extrudate TPV to at least a second intermeshing twin-screw extruder that is configured to receive the extrudate TPV composition at a temperature from T1 to T2 and configured to produce a TPV re-extrudate. The configuration of a second intermeshing twin-screw extruder can have any length/diameter ratio, including a ratio <30. The melt temperature is preferably 30-50° C. (86-122° F.) higher than T1.

In some embodiments, the second intermeshing twin-screw extruder is configured to receive the extrudate TPV composition directly from the first intermeshing twin-screw extruder.

However, a system for preparing a TPV composition can further comprise a strand pelletizer configured to cool and pellet the extrudate TPV composition from the first intermeshing twin-screw extruder, and a heater configured to receive the pelleted TPV composition and heat it to a processing temperature between T1 and T2 and to feed the TPV composition to the at least second intermeshing twin-screw extruder.

In some embodiments, a system for preparing a TPV composition is one arranged so that the first intermeshing twin-screw extruder feeds the extrudate TPV composition to a second intermeshing twin-screw extruder that in turn feeds the TPV re-extrudate to a strand pelletizer in which the re-extrudate TPV composition from the second intermeshing twin-screw extruder is cooled and pelleted. Such a system comprises at least two intermeshing twin-screw extruders arranged so that a first intermeshing twin-screw extruder, configured to receive polyolefin rubber, polyolefin plastic, any diluent, one or more curative compositions, and any colorant or fillers and configured to produce an extrudate TPV composition having a melt temperature ranging from T1 to T2. In some embodiments, among the elements of such a configuration, a first intermeshing twin-screw extruder can have a length/diameter ratio >30, and preferably >40. The system further comprises at least a second intermeshing twin-screw extruder that is configured to receive the extrudate TPV composition at temperature from T1 to T2 and configured to produce a TPV re-extrudate. The configuration of a second intermeshing twin-screw extruder can have any length/diameter ratio, including a ratio <30. The system in some embodiments further comprises a strand pelletizer configured to receive the TPV re-extrudate from the second intermeshing twin-screw extruder and configured to cool and pellet the TPV re-extrudate. As with extruders, pelletizers are available from a number of manufacturers, and in some instances can be purchased together with an extruder as an "add on."

Figure 4:
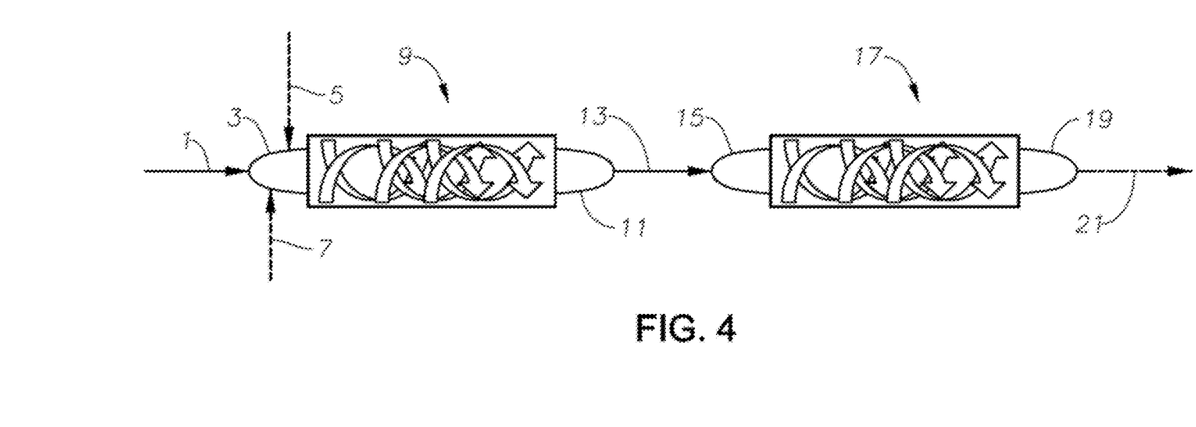
FIG. 4 is a schematic illustration of one embodiment of an apparatus for preparing a TPV re-extrudate.

Referring now to FIG. 4, a schematic illustration of one embodiment of an apparatus according to the present disclosure, a TPV feed 1, comprising the unvulcanized components of a TPV composition including rubber component ingredients and thermoplastic components, is introduced into an inlet 3 of a first intermeshing twin-screw extruder or other reactive mixer 9 sufficient to perform dynamic vulcanization to form a TPV composition. The TPV feed can comprise all of the components for forming a dynamically vulcanized TPV composition, or alternatively, the inlet 3 can be configured to also receive additional components of the finished TPV composition, such a processing oil, a masterbatch of curing agent(s) (such as a resin-in-oil composition), and/or further additives, via one or more optional feeds 5 and 7. After dynamic vulcanization is complete, forming a TPV extrudate, the TPV extrudate is fed via an outlet 11 to a transport line 13. Either or both of the outlet 11 and transport line 13 can include an optional heater (not shown) for controlling the temperature of the feed to the inlet 15 of a second (one or more) intermeshing twin-screw extruder 17. The TPV extrudate is homogenized in the second intermeshing twin-screw extruder and then a TPV re-extrudate 21 is fed via an outlet 19 to further processing, e.g. by cooling and pelleting the TPV re-extrudate in a pelletizer (not shown). The outlet 19 can be configured with an extrusion die to shape the re-extrudate if that is desired for any reason.

In some embodiments, a system for preparing a TPV composition comprises a heater configured to receive a pelleted TPV composition and heat it to a processing temperature between T1 and T2 and configured to feed the TPV composition to an intermeshing twin-screw extruder that is configured to receive polyolefin rubber, polyolefin plastic, any diluent, one or more curative compositions, and any colorant or fillers and configured to produce a re-extrudate TPV composition. Such embodiments can further comprise a strand pelletizer configured to receive the TPV re-extrudate from the intermeshing twin-screw extruder and configured to cool and pellet the TPV re-extrudate.

Figure 5:
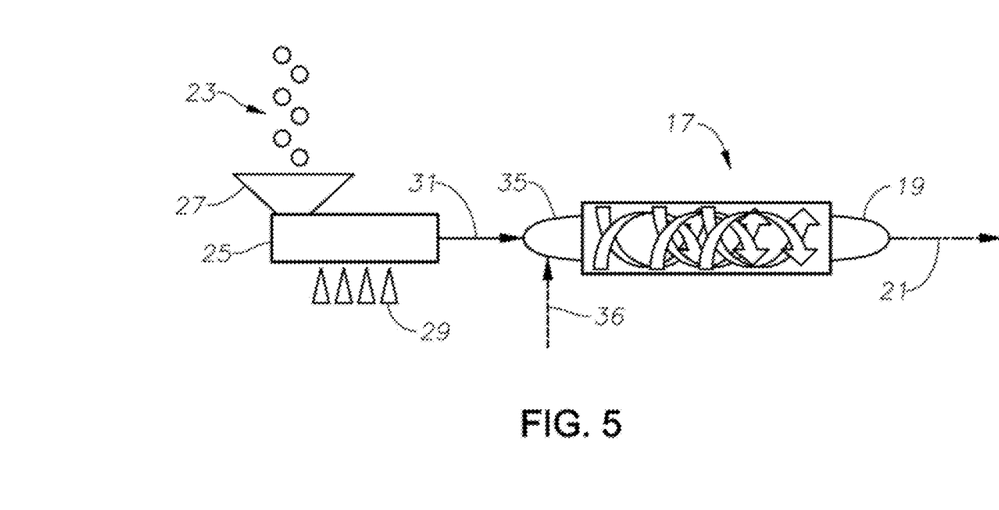
FIG. 5 is a schematic illustration of a second embodiment of an apparatus for preparing a TPV re-extrudate.

Referring now to FIG. 5, a schematic illustration of another embodiment of an apparatus according to the present disclosure, a feed 23 comprising one or more selected previously prepared (for example, in the form of pellets) TPV compositions is introduced to a heater 25 via an inlet 27 that is configured to receive the selected TPV composition. The heater comprises a heat source 29 that is configured to raise the temperature of the TPV composition to at least the Tm of the TPV composition and maintain the temperature of the TPV composition at a desired temperature between Tm and the degradation temperature of the TPV composition. The melted TPV composition is fed via a transport line 31 to the inlet 35 of an intermeshing twin-screw extruder 17, the inlet optionally being configured to accept one or more additives via one or more feeds 36. The TPV composition is homogenized and then fed via an outlet 19 to provide a TPV re-extrudate 21 that can be fed, for example, to a pelletizer (not shown) to be cooled and pelleted, or to any other desired downstream process. The outlet 19 can be configured with an extrusion die to shape the re-extrudate in some fashion if that is desired.

EMBODIMENTS

Embodiment 1

A method for processing a thermoplastic vulcanizate (TPV) composition comprising a) melting at least one selected TPV composition, and if more than one TPV composition is selected then combining the TPV compositions before or after melting, to form a TPV melt;

b) mixing the TPV melt in an intermeshing twin-screw extruder at a temperature sufficient to maintain the TPV composition in the melted state to obtain a TPV re-extrudate; and c) recovering the TPV re-extrudate.

Embodiment 2

The method of Embodiment 1, in which the temperature in step b) is from 86° F. (30° C.) above the melting temperature of the plastic matrix of the TPV up to the degradation temperature of the plastic matrix of the TPV.

Embodiment 3

The method of Embodiment 1, in which the temperature in step b) is from 86° F. (30° C.) above the melting temperature of the plastic matrix of the TPV up to 122° F. (50° C.) above the melting temperature of the plastic matrix of the TPV.

Embodiment 4

The method of any one of Embodiments 1-3, in which the plastic matrix is polypropylene-based and the temperature in step b) is from 350-580° F. (180-300° C.).

Embodiment 5

The method of any one of Embodiments 1-4, in which the torque of the twin screw extruder is from 20-80% of the maximum torque of the extruder.

Embodiment 6

The method of any one of Embodiments 1-5, in which the pressure in the extruder is from 1-20 bar.

Embodiment 7

The method of any one of Embodiments 1-6, in which the screw speed of the extruder is from 50 to 500 revolutions per minute.

Embodiment 8

The method of any one of Embodiments 1-7, in which the temperature in step b) is from 200-500° F. (93-260° C.), the torque of the intermeshing twin screw extruder is from 20-45% of the maximum torque of the extruder, the pressure in the intermeshing twin-screw extruder is from 4-6 bar, and screw speed of the intermeshing twin-screw extruder is from 50 to 500 revolutions per minute.

Embodiment 9

The method of any one of Embodiments 1-8, in which the at least one TPV composition is prepared by:
a) combining at least one propylene-ethylene-diene terpolymer (polyolefin thermoset rubber), a polyolefin plastic, one or more curatives, and optionally one or more diluents, in a twin-screw reactive extruder to form a TPV formulation;
b) mixing the TPV formulation for a time sufficient to allow complete phase inversion by dynamic vulcanization to form a crosslinked propylene-ethylene-diene terpolymer rubber phase dispersed in a polyolefin plastic phase, and mixing the resulting TPV composition at a temperature above the melting temperature of the TPV composition to form an extrudate.

Embodiment 10

A TPV composition obtained by a process comprising
a) melting at least one selected TPV composition, and if more than one TPV composition is selected then combining the melted TPV compositions, to form a TPV melt; and
b) mixing the TPV melt in an intermeshing twin-screw extruder at a temperature sufficient to maintain the TPV composition in the melted state to obtain a TPV re-extrudate; and
c) recovering the TPV re-extrudate.

Embodiment 11

The TPV composition of Embodiment 10, having a particle size dispersion index (PSDI) of rubber particles in the TPV re-extrudate, below 1.6.

Embodiment 12

The TPV composition of Embodiment 11, having a PSDI of from 1.0 to 1.6.

Embodiment 13

The TPV composition of any one of Embodiments 10-12, in which the at least one TPV composition is prepared by:
a) combining at least one propylene-ethylene-diene terpolymer (polyolefin thermoset rubber), a polyolefin plastic, one or more curatives, and optionally one or more diluents, in an intermeshing twin-screw reactive extruder to form a TPV formulation;
b) mixing the TPV formulation for a time sufficient to allow complete phase inversion by dynamic vulcanization to form a crosslinked propylene-ethylene-diene terpolymer rubber phase dispersed in a polyolefin plastic phase, and mixing the resulting TPV composition at a temperature above the melting temperature of the TPV composition.

Embodiment 14

A system for preparing a TPV composition comprising at least two intermeshing twin-screw extruders arranged such that a first intermeshing twin-screw extruder that is configured to receive rubber polymer monomers, polyolefin, any diluent, one or more curative compositions, and any colorant or fillers and configured to produce an extrudate TPV composition having a melt temperature ranging from T1 (=Tm) to T2 (up to but below the lowest degradation temperature among the TPV components), and to feed the extrudate TPV composition to at least a second intermeshing twin-screw extruder configured to receive the extrudate TPV composition at temperature from T1 to T2 and configured to produce a TPV re-extrudate.

Embodiment 15

The system of Embodiment 14, that further comprises a strand pelletizer configured to receive the extrudate TPV composition from the first intermeshing twin-screw extruder and configured to cool and pelletize the extrudate TPV composition, a heater that is configured to receive the pelleted TPV composition and heat the pelleted TPV composition to a processing temperature between T1 and T2 and feed the heated TPV composition to at least a second intermeshing twin-screw extruder configured to receive the heated TPV composition.

Embodiment 16

The system of Embodiment 14, that further comprises a strand pelletizer configured to receive re-extrudate TPV composition from the second intermeshing twin-screw extruder and configured to cool and pellet the re-extrudate TPV composition.

Embodiment 17

A system for preparing a TPV composition comprises a heater configured to receive a pelleted TPV composition (or a mixture of solid TPV composition) and heat it to a processing temperature between T1 (the melting temperature of the TPV composition) and T2 (up to, but below, the lowest decomposition temperature among the components of the TPV composition) and configured to feed the TPV composition to an intermeshing twin-screw extruder that is configured to receive rubber polymer monomers, polyolefin, any diluent, one or more curative compositions, and any colorant or fillers and configured to produce a re-extrudate TPV composition. Such embodiments can further comprise a strand pelletizer configured to receive the TPV re-extrudate from the intermeshing twin-screw extruder and configured to cool and pellet the TPV re-extrudate.

EXAMPLES

Santoprene™ TPV

A commercial Santoprene™ 111-35, ExxonMobil Chemical, made by in-situ dynamic vulcanization using a commercial twin-screw reactive extruder (ZSK 160, 160 mm extruder, with length/diameter ratio of 45) was the starting TPV material and is used as the control. This Santoprene™ has approximately 27% EPDM, 55% oil, 8% PP, and 8% clay, all in weight percent. Without accounting the oil, this product has 63% EPDM, 18.5% PP, and 18.5% clay. Additionally, 0.65% phenolic resin, 0.27% stannous chloride, and 0.53% zinc oxide were added as curatives whereas 0.54% carbon black (CB) was used as colorant.

Twin Screw Extrusion Homogenization of TPV

A 16 mm ThermoPrism TSE (twin-screw extruder) with a counter-rotating intermeshing twin screw (length/diameter ratio of 25) was employed to further homogenize these commercially prepared Santoprene™ control pellets. Control Santoprene™ pellets were gravimetrically fed into the extruder and homogenized under various extrusion conditions. Five homogenized Santoprene™ compositions were prepared and their extrusion homogenization conditions are listed in Table 1. In general, shear and extensional stresses, responsible for mixing and homogenization, increase with decreasing temperature whereas the shear rate increases with increasing RPM.

TABLE 1

Extrusion conditions used.

| Parameter | Control | Example 1 | Example 2 | Example 3 | Example 4 | Example 5 |
|---|---|---|---|---|---|---|
| Run Time (min) | None | 31 | 25 | 20 | 22 | 20 |
| TSE RPM | None | 100 | 200 | 300 | 300 | 300 |
| Temp ° C. | None | 250 | 250 | 250 | 225 | 200 |
| Feed Rate % | None | 32 | 45 | 45 | 45 | 45 |
| Pressure, bar | None | 4 | 6 | 5 | 5 | 5 |
| Torque % | None | 30 | 29 | 24 | 24 | 24 |

Dispersion Size Measurement

Figure 2A:
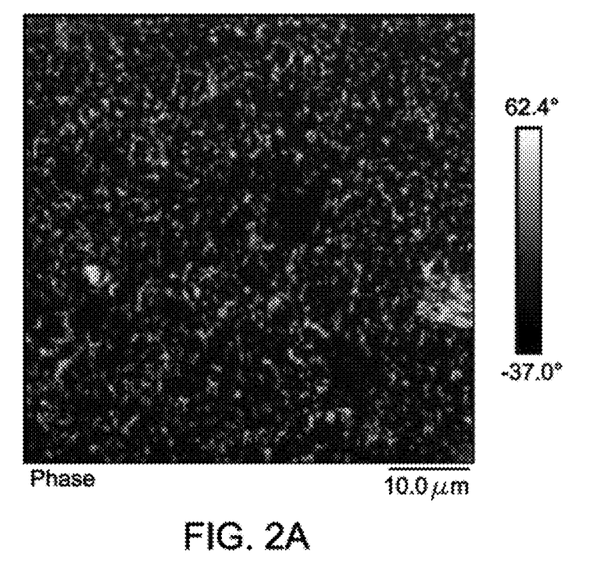
FIGS. 2A and 2B show representative tapping phase images before (FIG. 2A) and after (FIG. 2B) image processing by scanning probe image processing software (SPIP, Image Metrology).
Figure 2B:
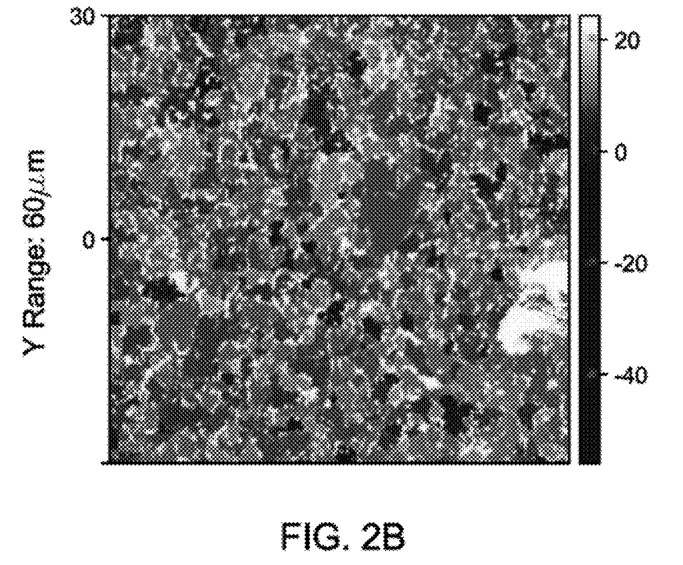

All TPV samples, including control, were cryo-faced using a cryo-microtome (Leica) and examined afterward by a tapping phase AFM (atomic force microscopy, Icon, Bruker). For each sample, three 60 micron by 60 micron (i.e. 3600 micron$^2$) phase images were collected and then processed by scanning probe image processing software (SPIP, Image Metrology). To produce FIGS. 2A and 2B, a tapping phase AFM image was flattened first with streaks and contaminants removed followed by thresholding and splitting before measuring and counting dispersion particles. Image processing results of control and examples 1-5 TPVs are tabulated in Table 2. Particle count is the number of dispersion particles measured in processed images and Dn, Dv, and Dw are equivalent dispersion diameters of number average, weight average, and volume average respectively. As indicated in Table 2, the dispersion shape, as measured by aspect ratio, and general size, as measured by Dn, Dv, and Dw, are relatively unchanged by extrusion homogenization. However, the overall dispersion uniformity, as measured by PSDI and by Dv/Dn, is clearly improved by this extrusion homogenization.

TABLE 2

Crosslinked rubber dispersion size analyses.

| Example No. | Particle count | Area percent | Dn, micron | Dw, micron | Dv, micron | PSDI = Dw/Dn | Dv/Dn | Aspect Ratio |
|---|---|---|---|---|---|---|---|---|
| Control | 2675 | 76.48 | 1.582 | 2.489 | 3.164 | 1.57 | 2 | 1.85 |
| 1 | 2358 | 79.67 | 1.843 | 2.526 | 3.175 | 1.37 | 1.72 | 1.88 |
| 2 | 3128 | 74.95 | 1.506 | 2.243 | 2.977 | 1.49 | 1.98 | 1.83 |
| 3 | 2537 | 86.2 | 1.823 | 2.584 | 3.339 | 1.42 | 1.83 | 1.99 |
| 4 | 2617 | 84.9 | 1.776 | 2.535 | 3.283 | 1.43 | 1.85 | 1.86 |
| 5 | 2633 | 86.01 | 1.832 | 2.457 | 2.978 | 1.34 | 1.63 | 1.87 |

Elastic Properties

After compression molding of all TPV samples into plaques, their mechanical properties were measured using an instrument manufactured by Instron and following ASTM standards; results are listed in Table 3. As indicated in Table 3, extrusion homogenization could lead to higher modulus (stronger retractive force), higher yield stress, higher elongation to break, and lower hysteresis (less energy loss during cyclic loading, or more elastic).

TABLE 3

Elastic properties.

| Example No. | Flex Modulus MPa | Yield Stress MPa | Break elongation % | $1^{st}$ hysteresis Joules | $2^{nd}$ hysteresis Joules | $1^{st}$ strength MPa | $2^{nd}$ strength MPa |
|---|---|---|---|---|---|---|---|
| Control | 6.33 | 1.48 | 157.24 | 0.235 | 0.171 | 1.137 | 1.072 |
| 1 | 6.49 | 2.36 | 258.04 | 0.225 | 0.169 | 1.093 | 1.048 |

TABLE 3-continued

Elastic properties.

| Example No. | Flex Modulus MPa | Yield Stress MPa | Break elongation % | $1^{st}$ hysteresis Joules | $2^{nd}$ hysteresis Joules | $1^{st}$ strength MPa | $2^{nd}$ strength MPa |
|---|---|---|---|---|---|---|---|
| 2 | 6.53 | 2.26 | 269.36 | 0.210 | 0.159 | 1.027 | 0.988 |
| 3 | 6.37 | 2.43 | 253.98 | 0.175 | 0.135 | 0.930 | 0.894 |
| 4 | 6.61 | 2.26 | 266.90 | 0.174 | 0.135 | 0.925 | 0.890 |
| 5 | 6.66 | 2.41 | 290.70 | 0.153 | 0.120 | 0.856 | 0.823 |

Dispersion Uniformity and Elastic Rebound

Figure 3:
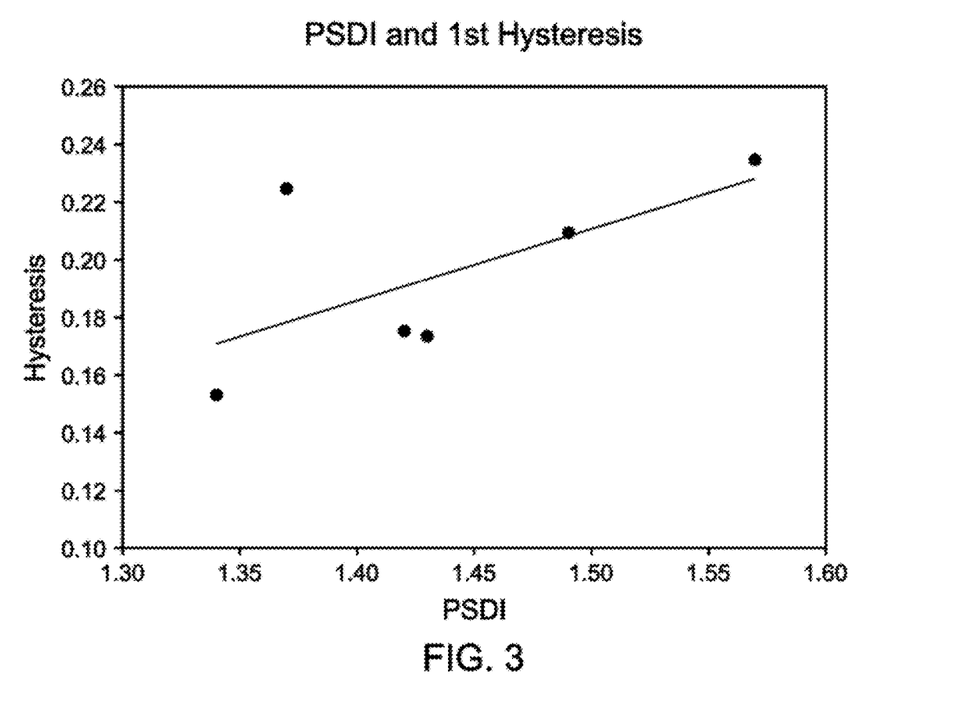
FIG. 3 shows a plot of hysteresis versus rubber dispersion uniformity.

In FIG. 3, first hysteresis of all TPV samples are plotted against their PSDI values. Improving dispersion uniformity by post-manufacturing extrusion homogenization can deliver better elastic properties. Example 5 appears to have the best properties and was prepared under highest stress (lowest extrusion temperature) and rate (highest RPM). Hence, increasing the extrusion homogenization RPM while running at lower extrusion temperature without degrading PP and EPDM might provide TPV with improved elastic properties.

While the present disclosure has been described and illustrated by reference to particular embodiments, those of ordinary skill in the art will appreciate that the disclosure invention lends itself to variations not necessarily illustrated herein. For this reason, then, reference should be made solely to the appended claims for purposes of determining the scope of the present invention. Further, the term "comprising" is considered synonymous with the term "including". Likewise, whenever a composition, an element or a group of elements is preceded with the transitional phrase "comprising", it is understood that we also contemplate the same composition or group of elements with transitional phrases "consisting essentially of", "consisting of", "selected from the group consisting of", or "is" preceding the recitation of the composition, element, or elements and vice versa.

The invention claimed is:

1. A method for processing a thermoplastic vulcanizate (TPV) composition comprising
    a) melting at least one selected TPV composition, and if more than one TPV composition is selected then combining the TPV compositions before or after melting, to form a TPV melt; and
    b) mixing the TPV melt in an intermeshing twin-screw extruder at a temperature sufficient to maintain the TPV composition in the melted state to obtain a TPV re-extrudate; and
    c) recovering the TPV re-extrudate,
    wherein the TPV re-extrudate has a particle size dispersion index (PSDI) of rubber particles in the TPV re-extrudate, less than 1.6.

2. The method of claim 1, in which the temperature in step b) is from 86° F. (30° C.) above the melting temperature of the plastic matrix of the TPV up to the degradation temperature of the plastic matrix of the TPV.

3. The method of claim 1, in which the temperature in step b) is from 86° F. (30° C.) above the melting temperature of the plastic matrix of the TPV up to 122° F. (50° C.) above the melting temperature of the plastic matrix of the TPV.

4. The method of claim 1, in which the plastic matrix is polypropylene-based and the temperature in step b) is from 350-580° F. (180-300° C.).

5. The method of claim 1, in which the torque of the twin screw extruder is from 20-80% of the maximum torque of the extruder.

6. The method of claim 1, in which the pressure in the extruder is from 1-20 bar.

7. The method of claim 1, in which the screw speed of the extruder is from 50 to 500 revolutions per minute.

8. The method of claim 1, in which the temperature in step b) is from 200-500° F. (93-260° C.), the torque of the intermeshing twin screw extruder is from 20-45% of the maximum torque of the extruder, the pressure in the intermeshing twin-screw extruder is from 4-6 bar, and screw speed of the intermeshing twin-screw extruder is from 50 to 500 revolutions per minute.

9. The method of claim 1, in which the at least one TPV composition is prepared by
    a) combining at least one propylene-ethylene-diene terpolymer, a polyolefin plastic, one or more curatives, and optionally one or more diluents, in a twin-screw reactive extruder to form a TPV formulation; and
    b) mixing the TPV formulation for a time sufficient to allow complete phase inversion by dynamic vulcanization to form a crosslinked propylene-ethylene-diene terpolymer rubber phase dispersed in a polyolefin plastic phase, and mixing the resulting TPV composition at a temperature above the melting temperature of the TPV composition to form an extrudate.

* * * * *